United States Patent [19]

Finkl

[11] 3,849,125

[45] Nov. 19, 1974

[54] METHOD OF SULPHUR ADDITION FUME CONTROL

[75] Inventor: William F. Finkl, Evanston, Ill.

[73] Assignee: A. Finkl & Sons Company, Chicago, Ill.

[22] Filed: Mar. 26, 1973

[21] Appl. No.: 345,244

[52] U.S. Cl. .................................. 75/53, 75/129
[51] Int. Cl. .......................... C21c 7/00, C22c 33/00
[58] Field of Search ............................ 75/10–12, 53, 75/129, 123 G, 126 L, 128 P

[56] References Cited
UNITED STATES PATENTS

| | | | |
|---|---|---|---|
| 1,959,758 | 5/1934 | Graham | 75/123 G |
| 3,511,647 | 5/1970 | Layne | 75/129 |
| 3,634,073 | 1/1972 | Cutton | 75/129 |
| 3,723,094 | 3/1973 | Schlatter | 75/11 |

Primary Examiner—L. Dewayne Rutledge
Assistant Examiner—Peter D. Rosenberg

[57] ABSTRACT

A method of reducing, and possibly substantially eliminating, sulphur fumes during tapping from the melting unit, such as the electric furnace, which includes making sulphur additions by the use of solid iron sulfides rather than elemental sulphur, such as stick sulphur.

2 Claims, No Drawings

METHOD OF SULPHUR ADDITION FUME CONTROL

This invention relates to a method of controlling, if not eliminating, the generation of sulphur fumes during the tapping portion of the steelmaking cycle.

BACKGROUND OF THE INVENTION

Many steel specifications require significant alloying quantities of sulphur, primarily for its ability to improve machinability of the final product. Indeed, in some applications such as forging dies the product may be ordered to any one of a number of machinability ratings as well as hardenability and other factors and the addition of sulphur, and close control over the degree of addition, is an important step in the steelmaking process.

The most widely practiced method of adding specification quantities of sulphur is to make the addition during tap from the melting unit. Thus, and using an electric furnace as an example, it is common practice to take a sample from the bath just prior to tap to check the sulphur content, and of course other elements if desired, such as carbon. The amount of sulphur needed, if any, to ensure that the final sulphur content will be within the specification is then calculated and a quantity of sulphur sufficient to ensure meeting the final specification is then added to the ladle.

Usually the sulphur is added in the form of stick sulphur which is, essentially, elemental sulphur. From experience it has been determined that recovery of about 60% can be expected from stick sulphur. The non-recovered sulphur easily ignites in air to form sulphur dioxide, a noxious gas with a strong, pungent objectionable odor. Specifically, as the steel is tapped any addition of stick sulphur whether made to the ladle prior to and/or during tap or to the tapping stream will readily boil, thereby giving off sulphur vapor, which combines with oxygen from the atmosphere to produce sulphur dioxide. Since the density of the stick sulphur is low and the boiling point is also low, this sulphur vapor generation, and subsequent sulphur dioxide fume generation, occurs before molten steel reactions involving sulphur can reach completion. As those skilled in the art will appreciate, the steel reactions are essentially the formation of Mn S in the steel which is non-odorous coupled with the vaporization of uncombined sulphur, which vaporization causes environmental conditions to become very objectionable. Sulphur dioxide coupled with moisture on the skin, in mucuous membrane tissue, and in the lubricating eye fluids, forms $H_2SO_3$, an irritant of great magnitude. As environmental pollution standards become more and more stringent the disadvantages of the aforementioned method of sulphur addition increases.

The control over the degree or accuracy of addition of sulphur realizable from many present practices is often a problem, particularly when sulphur additions are made to a heat having a mild or moderate slag.

SUMMARY OF THE INVENTION

The present invention overcomes the problem of generation of noxious sulphur fumes during the tapping portion of the steelmaking cycle by the use of iron sulfides as a source of specification sulphur during the tapping step in the steelmaking process, and provides the steelmaker with closer control over sulphur additions.

The phrase "iron sulfides" is used to denote both the mono- and di-sulfide forms of iron sulfide, and more specifically those solid sulfides having a specific gravity of about 4.3 to 5.0, including especially $FeS_2$.

Accordingly, a primary object of this invention is to provide a method of greatly reducing, and possibly eliminating, the generation of noxious sulphur fumes during the tapping step of the steelmaking process.

Another object is to provide a method of greatly reducing, or eliminating, noxious sulphur fume generation during the steelmaking process which is more efficient and at the same time less costly than present methods of making specification sulphur additions.

Other objects and advantages will become apparent from reading the following description of the invention.

In what is currently considered to be the preferred mode of operation, the process steps up to the point of tap from the furnace may be identical to present practice, including the taking of a sample from the furnace just prior to tap and the running of a chemical analysis test on said sample for sulphur content. As a specific example, in a steel having the following nominal composition: C — .47/.55; Mn — .95/1.30; S — .06/.10; Si — .35; Ni — .25; Cr — .50/.90; Mo — .10/.25; V — .03/.05, the sulphur content may be in the range of about 0.030 to 0.05 percent just prior to tap. It has been established that a sulphur recovery of very close to 90 percent can be consistently achieved using iron sulfides added to the ladle prior to tap for sulphur addition. Knowing this expected recovery, the existing sulphur content, the metallic weight of the furnace charge, and the slag composition, if any, the weight of iron sulfides required can be calculated.

A typical example of the calculation for adding 0.060 percent sulphur to a bath is as follows.

Assume a contained sulphur content of 53 percent sulphur in iron sulfide, and a recovery of 90 percent.

1. 0.060% S at 90% recovery = 0.067 S to be added.
2. 0.067% S at 53% contained S = 0.126% iron sulfide.
3. 0.126% iron sulfide = 2½ lbs. iron sulfide per ton.

An example of a campaign to establish the percent recovery factor of iron sulfide as a ladle addition during tapping is as follows:

| Heat No. | Last S Reported | Points of S Added To Ladle | Ladle Test | % Recovery |
|---|---|---|---|---|
| 128,693 | .035 | .050 | .079 | 88% |
| 228,419 | .039 | .051 | .080 | 80% |
| 138,704 | .045 | .045 | .084 | 87% |
| 138,724 | .029 | .051 | .082 | 100% |
| Avg. | .037 | .049 | .081 | 89% |

The cost saving per ton can be determined from a comparison of the per ton cost for sulphur addition using stick sulphur versus iron sulfide. Thus, assuming again that 0.060 percent sulphur must be added, the cost using stick sulphur in 1,500 lb. lots and a 60 percent recovery factor is about $0.23 per ton. The cost to add 0.060 percent S using iron sulfide in 3,000 lb.

lots and a 90 percent recovery factor, and taking into account the Fe credit, is about $0.12 per ton, or a saving of nearly 48 percent.

The advantages of making sulphur addition by the use of iron sulfides is believed to be attributable to the fact that the only formation of sulphur dioxide from iron sulfide is the result of slow decomposition of the sulfide to S, which then would boil. This is a retarded reaction, almost undetectable as to objectionable fume emission.

Slag may or may not be a factor, depending on its chemical composition and the quantity present during tapping. In the campaign figure given above, the bath metal was substantially slag-free at the time of tap from the furnace, and accordingly the possible effect of slag has not been included in a determination of the recovery factor.

Even when a mild to moderate slag cover is present, and therefore a further parameter added to the determination of the recovery factor, the steelmaker is by contrast in a much improved position as contrasted to elemental sulphur addition practice, since the variance in the recovery factor in iron sulfide practice will be much less than in elemental sulphur practice.

In this connection it should be noted that the term "substantially slag-free" is a relative term since, as a practical matter, at the present time it is not feasible to remove every bit of slag from the surface of the metal in the furnace. Usually at least patches of slag will be present. The term is intended to be used in the sense that insufficient slag is present to have a deleterious effect on the intended sulphur reaction.

A preferred embodiment of the invention has been described. It will at once be apparent to those skilled in the art, however, that various changes may be made within the spirit and scope of the invention, which are not precisely set forth in the foregoing description. Accordingly, it is intended that the scope of the invention be limited not by the foregoing description, but solely by the hereafter appended claims when interpreted in light of the specification and the pertinent prior art.

I claim:

1. In a method of controlling sulphur fume generation during the addition of specification sulphur in the steelmaking process, the steps of forming a heat of molten steel which requires the addition of sulphur to ensure achievement of a predetermined sulphur level in the final product, said molten steel having the following nominal composition:

| | |
|---|---|
| C | .47/.55 |
| Mn | .95/1.30 |
| S | .06/.10 |
| Si | .35 |
| Ni | .25 |
| Cr | .50/.90 |
| Mo | .10/.25 |
| V | .03/.05 | conditioning the molten steel prior to tap by removing slag whereby the steel is tapped in a substantially slag-free condition, and then adding iron sulfide, as a source of sulphur to the tap vessel, while tapping the molten steel.

2. The method of claim 1 further characterized in the the iron sulfide is added to the tap vessel prior to tap.

* * * * *